US011212195B1

(12) United States Patent
Tamir et al.

(10) Patent No.: US 11,212,195 B1
(45) Date of Patent: Dec. 28, 2021

(54) IT MONITORING RECOMMENDATION SERVICE

(71) Applicant: Microsoft Technology Licensing, LLC, Redmond, WA (US)

(72) Inventors: Gal Tamir, Avichayil (IL); Rachel Lemberg, Herzliya (IL); Zakie Mashiah, Qiryat Ono (IL); Shane Hu, Seattle, WA (US); Tamar Agmon, Ramat Gan (IL); Navendu Jain, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/019,187

(22) Filed: Sep. 11, 2020

(51) Int. Cl.
*H04L 12/24* (2006.01)
*G06N 20/00* (2019.01)

(52) U.S. Cl.
CPC ......... *H04L 41/5009* (2013.01); *G06N 20/00* (2019.01); *H04L 41/16* (2013.01)

(58) Field of Classification Search
CPC ...... H04L 41/5009; H04L 41/16; G06N 20/00
See application file for complete search history.

(56) References Cited

U.S. PATENT DOCUMENTS

| 10,198,339 | B2 | 2/2019 | Salunke et al. | |
|---|---|---|---|---|
| 10,270,668 | B1 | 4/2019 | Thompson et al. | |
| 10,404,524 | B2 | 9/2019 | Velipasaoglu et al. | |
| 10,445,217 | B2 | 10/2019 | Parthasarathy et al. | |
| 10,628,252 | B2 | 4/2020 | Wang et al. | |
| 10,671,507 | B2 | 6/2020 | Prabath et al. | |
| 2013/0311481 | A1* | 11/2013 | Bhatt | G06F 16/245 707/741 |
| 2015/0156213 | A1* | 6/2015 | Baker | H04L 63/1416 726/23 |
| 2015/0180744 | A1* | 6/2015 | Joshi | H04L 43/0894 709/224 |
| 2015/0379429 | A1* | 12/2015 | Lee | G06N 20/00 706/11 |
| 2018/0218269 | A1* | 8/2018 | Oliner | G06F 16/26 |
| 2018/0248745 | A1* | 8/2018 | Ahmed | G06F 11/008 |
| 2018/0276256 | A1* | 9/2018 | Sarkar | G06N 20/00 |

(Continued)

OTHER PUBLICATIONS

Ren, et al., "Time-Series Anomaly Detection Service at Microsoft", In Proceedings of the 25th ACM SIGKDD International Conference on Knowledge Discovery & Data Mining, Aug. 4, 2019, pp. 3009-3017.

*Primary Examiner* — Michael Won

(57) ABSTRACT

Operational metrics of a distributed collection of servers in a cloud environment are analyzed by a service to intelligently machine learn which operational metric is highly correlated to incidents or failures in the cloud environment. To do so, metric values of the operational metrics are analyzed over time by the service to check whether the operation metrics exceed a particular metric threshold. If so, the service also checks whether such spikes in the operation metric above the metric thresholds occurred during known cloud incidents. Statistics are calculated reflecting the number of times the operational metrics spiked during times of cloud incidents and spiked during times without cloud incidents. Correlation scores based on these statistics are calculated and used to select the correlated operational metrics that are most correlated to cloud failures.

20 Claims, 9 Drawing Sheets

(56) References Cited

U.S. PATENT DOCUMENTS

| | | | |
|---|---|---|---|
| 2019/0034392 A1* | 1/2019 | Medlyn | G06F 40/137 |
| 2019/0265971 A1* | 8/2019 | Behzadi | H04L 67/12 |
| 2020/0042799 A1* | 2/2020 | Huang | G06K 9/6262 |
| 2020/0057933 A1* | 2/2020 | Cosgrove | G06N 3/04 |
| 2020/0201727 A1 | 6/2020 | Nie et al. | |
| 2020/0250178 A1* | 8/2020 | Boster | G06F 16/248 |
| 2020/0284883 A1* | 9/2020 | Ferreira | G01S 7/4816 |

* cited by examiner

IT MONITORING RECOMMENDATION SERVICE

BACKGROUND

The proliferation of remote server processing, such as on-premises information technology (IT) networks, third-party cloud computing environments, and the like, has fundamentally transformed the software industry. Applications that were once downloaded onto client devices have migrated to remote servers that provide the processing resources necessary to host the applications and make them accessible over a network. For purposes of this disclosure, cloud computing and cloud-computing environments include both third-party cloud networks and on-premises IT networks that are maintained on an organization or company. The ability to provide cloud-based computing resources and storage enables consumers to flexibly control their computing and storage costs by only having to pay for needed cloud resources, instead of having to buy expensive hardware, software, and professional maintenance. Today's cloud environments allow customers to purchase and/or use a near endless amount of processor cycles and storage at the time of demand, rather than buying or leasing fixed hardware in provisioning cycles that are dictated by delays and costs of hardware manufacture and deployment.

But cloud computing is complex. Operating cloud environments and configuring virtualized resources requires a multitude of services to operate correctly. For example, it is not uncommon for a cloud environment to have hundreds or thousands of services providing different features to support remote hosting, everything from virtual machine (VM) management, central processing unit (CPU) usage, network bandwidth, and the like. All of these services—as well as the physical and virtual hardware running them—provide different weak points for cloud failure. CPU usage may unexpectedly rise, VMs may go offline, network bandwidth may shrink, or the like. Like nearly all software and hardware systems, cloud environments and their constituent services underperform or fail from time to time.

To mitigate losses from operational failures of a cloud environment, consumers sign detailed service level agreements (SLAs), which are contracts that try to quantify various cloud operational metrics and provide contractual resolutions when those metrics underperform. This creates a huge incentive—both financially and reputationally—for the cloud operator to make sure the cloud environment is functioning properly and able to meet its customers' processing demands. Additionally, customers who are clients of a cloud operator may also have SLA agreements with their own end customers as well, e.g., an application running in the cloud may have numerous clients of its own that require the application to meet specific operational metrics. It is vital for the cloud operator to both respond to cloud environment incidents as well as detect and predict when such incidents may occur.

Information technology (IT) professionals attempt to predict when incidents will occur by analyzing different operational metrics around the time of failures. This is an incredibly laborious process that largely centers on the skill of the IT professional. Human nature frequently clouds this analysis as the IT professional attempts to find the specific operational metric they suspect to be correlated to the failure, often time missing other metrics that would better predict failures. Today, correlation of cloud operational metrics to actual service failures is manually done, incredibly laborious, and highly inefficient.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples disclosed herein are directed to machine learning the operational metrics of a cloud environment that are most correlated to cloud incidents and failures. To do so, the operational metrics are accessed along with specific metric thresholds and the times of the cluster incidents. The operational metrics' data (metric values) are checked to determine when the operational metrics exceeded the metric thresholds during incident times of the cloud incidents and when the operational metrics exceeded the metric thresholds at times without cloud incidents. Statistical counts of the times the operational metrics spiked during and outside of a cluster incident, and these counts are used to calculate correlation scores for the operational metrics. The correlation scores may be used to select the operational metrics that are most correlative with—and therefore are highly predictive of—cloud incidents. Such correlative nature information may be shared with IT professionals or other users who are able to access the disclosed IT monitoring service.

BRIEF DESCRIPTION OF THE DRAWINGS

The disclosed examples are described in detail below with reference to the accompanying drawing figures listed below.

DETAILED DESCRIPTION

Figure 1:
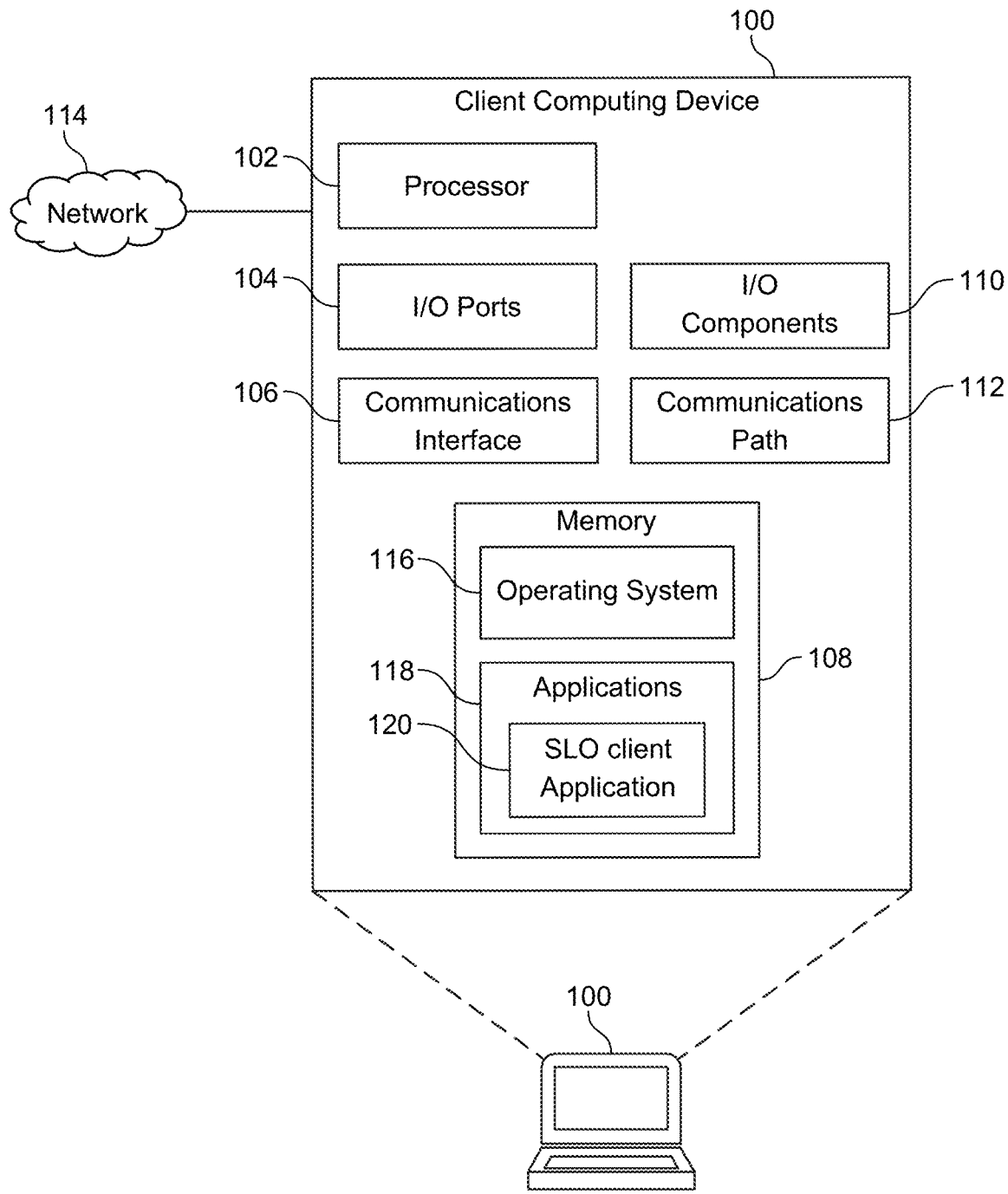
FIG. 1 illustrates a client computing device configured to provide a user access to a service level object (SLO) application in accordance with some of the embodiments disclosed herein.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As previously discussed, traditional attempts at trying to correlate operational metrics of cloud environments and on-premises IT networks to server resource and service failures is currently a manual process. IT professionals must hunt back through operational logs to try and isolate the operational metrics that were firing around the time of a failure. Frequently, the IT professionals do not know what they should be looking for or, if they do, only try to correlate a single metric to the failure in order to learn which metric to analyze the future to predict similar failures. Also, the IT professional brings their own biases about what metric likely caused or is correlated to the failure, which may cause them to overlook over seemingly innocuous metrics. For example, if a cloud failure is registered, an IT professional may be prone to look at CPU usage and storage capacity but not review metrics for input/output operations per second (IOPS), number of network calls received, network bandwidth, or the like—any of which may have better correlation to the failure, and thus better predictive value.

For the sake of clarity, the disclosed embodiments and examples are discussed herein in reference to a cloud environment, which may be a third-party operated cloud-computing network, an on-premises IT network of an organization, a combination thereof, or the like. The terms "cloud environment" and "cloud-computing environment," as referenced herein include third-party cloud environments, on-premises IT networks, and any other remote server networks.

As the number of operational metrics grow, it becomes increasingly difficult to understand relations or dependencies among the different services. For instance, storage services may provide some functionality or role in other network-based services, such as storage for virtual computing resources or archive storage for database services. Changes in the performance of one of these services may impact dependent services. If these dependencies are difficult to detect, then failures and other system events that occur may be difficult to diagnose or analyze. Network failures or events may affect multiple services, for instance, as common communication channels may be utilized amongst network services, making it difficult to determine the source cause of a network event. Identifying correlated events in a distributed system according to operational metrics may provide a way to dynamically detect correlated events in a distributed system, which may provide an automated way to discover hidden dependencies when problem solving failures. For instance, identifying aberrant operational metrics of a correlated event may be traceable to a particular network service, or portion of a network service, for troubleshooting.

The embodiments and examples disclosed herein generally relate to specialized operations and devices specifically configured to intelligently—and, in some cases, autonomously—machine learn the operational metrics of a cloud-computing environment ("cloud environment") that are predictive of cloud environment incidents and failures. An incident repository storing operational cloud incidents detected in the cloud environment is accessed to identify when the incidents were experienced. Myriad operational metrics of the cloud environment are analyzed to the determine whether their behavior is correlated or not to the reported incidents. For example, numerous incidents related to network availability going down may trigger embodiments to analyze different operational metrics (e.g., CPU usage, IOPS, etc.) to determine whether they spiked (or at least exceeded a monitoring threshold) during those incident times. The operational metrics that also spiked during, or just before, those times may be identified as a predictive metric of the incident, and thus monitored in the future to determine when the incident may occur again.

To identify the best operational metrics for predicting incidents, some embodiments compute scores for each analyzed operational metric that reflect the total number of times that metric spiked above a monitoring threshold and the number of times such spikes occurred during cloud incidents. This calculation reveals how times the spike of the metric correlated with an incident and how many times the spike of the metric was not correlated with the incident. In other words, from a detection standpoint, some of the disclosed embodiments determine how many spikes of the metric were positives and how many were false positives.

As the number of operational metrics grow, it becomes increasingly difficult to understand relations or dependencies among different cloud services. For example, storage services may provide some functionality or role in other cloud services, such as storage for virtual computing resources or archive storage for database services. Changes in the performance of one of these services may impact dependent services, and if these dependencies are difficult to detect, then failures and other system events that occur may be difficult to diagnose or analyze. Within the cloud environment, network failures or events may affect multiple services as common communication channels are used by different network services, making it difficult to determine the source cause of a network event. Identifying correlated events in a distributed system according to operational metrics provides a way to dynamically detect correlated events in a distributed cloud environment, providing an automated way to discover hidden dependencies when problem solving failures or making changes, such as upgrades to different portions of the cloud environment.

By understanding which operational metrics are correlated, or predictive of, cloud incidents, cloud operators are able to better tailor the cloud experience to meet different customer demands. For instance, a customer may require a certain amount of CPU processing cycles. The disclosed embodiments enable the cloud operator to machine learn which operational metrics predict downtime of processing resources. That, in turn, allows the cloud operator to stop future incidents or just more accurately analyze past performance of the cloud environment to identify when unreported incidents likely occurred (e.g., when the operational metric spiked but no incident was reported).

Also, the disclosed embodiments provide intelligence that is entirely machine driven, without the inherent biases of the IT professional. Without such biases, correlations that may typically not be apparent to IT professionals may be uncovered. This removes the need for a human to have to hunt for problems somewhat blindly and provides a deep learning experience to understand which actual metrics are related to incidents and which are not.

To aid the reader, some key definitions are provided below. As referenced herein, an "operational metric" or "metric" refers to a measurable quantity of an operation of a cloud-computing or on-premises IT environment measured across a particular timeframe. Operational metrics may include operational and hardware parameters such as, for example but without limitation, rates and types of requests received from clients, bandwidth utilization by such requests, CPU utilization, IOPS, number of failures, number of network calls received, calls to other cloud services, duration of operations, system processing latency, system component utilization, utilization of systems, services, device rates, IOPS, code or service exceptions, rate of exceptions, bytes transferred, success and failure rate of services, size of a queue service, rate of messages inbound and outbound, service or VM or machine restart, jitter of service latency, memory utilization parameters, virtual memory utilization, access parameters, and the like.

As referenced herein, "cloud incidents," "incidents," "cloud failures," and "failures" refer to a detected IT issue in the cloud environment that is determined to occur at particular incident time. Examples include, without limitation, an operation (e.g., create, read, update, delete or "CRUD") failure, VM impact, outages, latencies, critical failures, certificate operations, customer-reported errors, security attacks, network failures, or any SLA violation of the service environment. The incident times may include an actual time (e.g., 9:51:25 am) or a particular time series, which is a quantity of time (e.g., 9:50-9:55 pm).

A "metric threshold" refers to a specific value for a metric that, if exceeded, triggers an alert. The metric thresholds 228 may be manually set by a user, set by a machine-learning or artificial intelligence (AI) algorithm, or otherwise set by a computing device. In some examples, the metric thresholds are fixed. In others, the metric thresholds change over time, e.g., to accommodate daily surges in cloud demand, seasonality, or additional customers added to a cloud environment. For example, a metric threshold for CPU usage may be set at 50%, and if CPU usage exceeds that amount, an alert is recorded. Whether or not the alert triggered during an identified cloud incident may dictate whether the alert is classified as a false positive or true positive alert. In some embodiments, the most predictive alerts for whether cloud incidents are occurring may then be learned by analyzing which metrics, or combination of metrics, produced the highest number of true positives relative to the false positives; which metrics, or combination of metrices, were triggered on the most number of cloud incidents; or a combination thereof.

"Service level objectives" (SLOs) refer to goal operational parameters of a customer for a cloud environment. Distinction is made between an SLA, which is a contractual agreement that specifies what service are to be provided and SLOs, which are specific measurable characteristics of the SLA, such as availability, throughput, frequency, response time, quality, or the like. Together, SLOs are meant to define the expected service between the cloud provider and the customer and vary depending on the customer's urgency, resources, and budget, breaking each down into different "service level indicators" (SLIs) that represent specific operational parameters that collectively make up the SLOs. For instance, an SLO may specify that a particular application is accessible in the cloud environment 99.95% of the time, which comprises SLIs being met for a specific number of CPU cycles, network bandwidth, active memory, disk storage, and the like. SLOs may be expressed in myriad ways with any number of SLI combinations.

Some of the disclosed embodiments include an "SLO application," which is a client-side application that shows allows end users to view the predictive scores of different operational metrics relative to cloud incidents, as determined through the disclosed machine learning techniques discussed in more detail below. In some embodiments, the SLO application provides shows various operational metrics and identified cloud incidents mapped across different timelines. Statistical information indicative of the correlative nature of the operational statistics to the cloud incidents may also be shown to the user in SLO application, including, for example but without limitation, an overall correlation score, a number of positive alerts of the operational parameter to the incident, a number of false alerts of the operational parameter to the incident, a noise calculation, and a coverage score. In particular, the coverage score refers to the number of cloud incidents that are detected compared to the number of recorded cloud incidents recorded in an incident repository or database. As discussed in more detail below, these statistics are calculated by a "IT monitoring service" that is executed in the cloud environment.

Having generally provided an overview of some of the disclosed examples, attention is drawn to the accompanying drawings to further illustrate some additional details. The illustrated configurations and operational sequences are provided for to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

FIG. 1 is a block diagram of an example client computing device 100 for implementing aspects disclosed herein. Client computing device 100 includes one or more processors 102, input/output (I/O) ports 104, a communications interface 106, computer-storage memory (memory) 108, I/O components 110, and a communications path 112. The client computing device 100 is able to communicate over a network 114 with cloud services hosted in a cloud environment. Client computing device 100 may take the form any number of computing devices 100, such as laptops, smartphones, tablets, and the like. Also, while the client computing device 100 is depicted as a seemingly single device, multiple client computing devices 100 may work together and share the depicted device resources. For instance, various processors 102 and memory 108 may be housed and distributed across multiple client computing devices 100. The client computing device 100 is but one example of a suitable computing environment and is not intended to suggest any limitation as to the scope of use or functionality of the invention.

The processor 102 includes any number of microprocessors, microcontrollers, analog circuitry, or the like for that are programmed to execute computer-executable instructions for implementing aspects of this disclosure. In some examples, the processor 102 is programmed to execute instructions such as those illustrated in the other drawings discussed herein.

The I/O ports 104 connect various I/O components 110 to the client computing device 100. Example I/O components 110 include, for example but without limitation, speakers, displays, touch screens, augmented- and virtual-reality (AR and VR) headsets, peripheral devices, microphones, joysticks, scanner, printers, etc. Such components are well known to those in the art and need not be discussed at length herein.

The communications interface 106 allows software and data to be transferred between the client computer device 100 and external devices over the network 114. Examples of communications interface 106 may include a modem, a network interface (such as an Ethernet card), a communications port, a Personal Computer Memory Card International Association (PCMCIA) slot and card, etc. Software and data transferred via the communications interface 106 are in the form of signals that may be electronic, electromagnetic, optical or other signals capable of being received by communications interface 106. Such signals are provided to the communications interface 106 via the communications path (e.g., channel) 112. This communications path 112 carries the signals and may be implemented using a wired, wireless, fiber optic, telephone, cellular, radio frequency (RF), or other communications channel.

The network 114 may include any computer network or combination thereof. Examples of computer networks configurable to operate as network 306 include, without limitation, a wireless network; landline; cable line; digital subscriber line (DSL): fiber-optic line; cellular network (e.g., 3G, 4G, 5G, etc.); local area network (LAN); wide area network (WAN): metropolitan area network (MAN); or the like. The network 114 is not limited, however, to connections coupling separate computer units. Rather, the network 114 may also comprise subsystems that transfer data between servers or computing devices. For example, the network 114 may also include a point-to-point connection, the Internet, an Ethernet, an electrical bus, a neural network, or other internal system. Such networking architectures are well known and need not be discussed at depth herein.

The computer-storage memory 108 includes any quantity of memory devices associated with or accessible by the client computing device 100. The computer-storage memory 108 may take the form of the computer-storage media references below and operatively provide storage of computer-readable instructions, data structures, program modules and other data for the client computing device 100 to store and access instructions configured to carry out the various operations disclosed herein. The computer-storage memory 108 may include memory devices in the form of volatile and/or nonvolatile memory, removable or non-removable memory, data disks in virtual environments, or a combination thereof. And computer-storage memory 108 may include any quantity of memory associated with or accessible by the client computing device 100. Examples of client computing device 100 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other computer memory.

The computer-storage memory 108 may be internal to the client computing device 100 (as shown in FIG. 1), external to the client computing device 100 (not shown), or both (not shown). Additionally or alternatively, the computer-storage memory 108 may be distributed across multiple client computing devices 100 and/or servers, e.g., in a virtualized environment providing distributed processing. For the purposes of this disclosure, "computer storage media," "computer-storage memory," "memory," and "memory devices" are synonymous terms for the computer-storage media 108, and none of these terms include carrier waves or propagating signaling.

In some examples, the computer-storage memory 108 stores executable computer instructions for an operating system (OS) 116 and various software applications 118. The OS 116 may be any OS designed to the control the functionality of the client computing device 100, including, for example but without limitation: WINDOWS® developed by the MICROSOFT CORPORATION® of Redmond, Wash., MAC OS® developed by APPLE, INC.® of Cupertino, Calif., ANDROID™ developed by GOOGLE, INC.® of Mountain View, Calif., open-source LINUX®, and the like.

Figure 5:
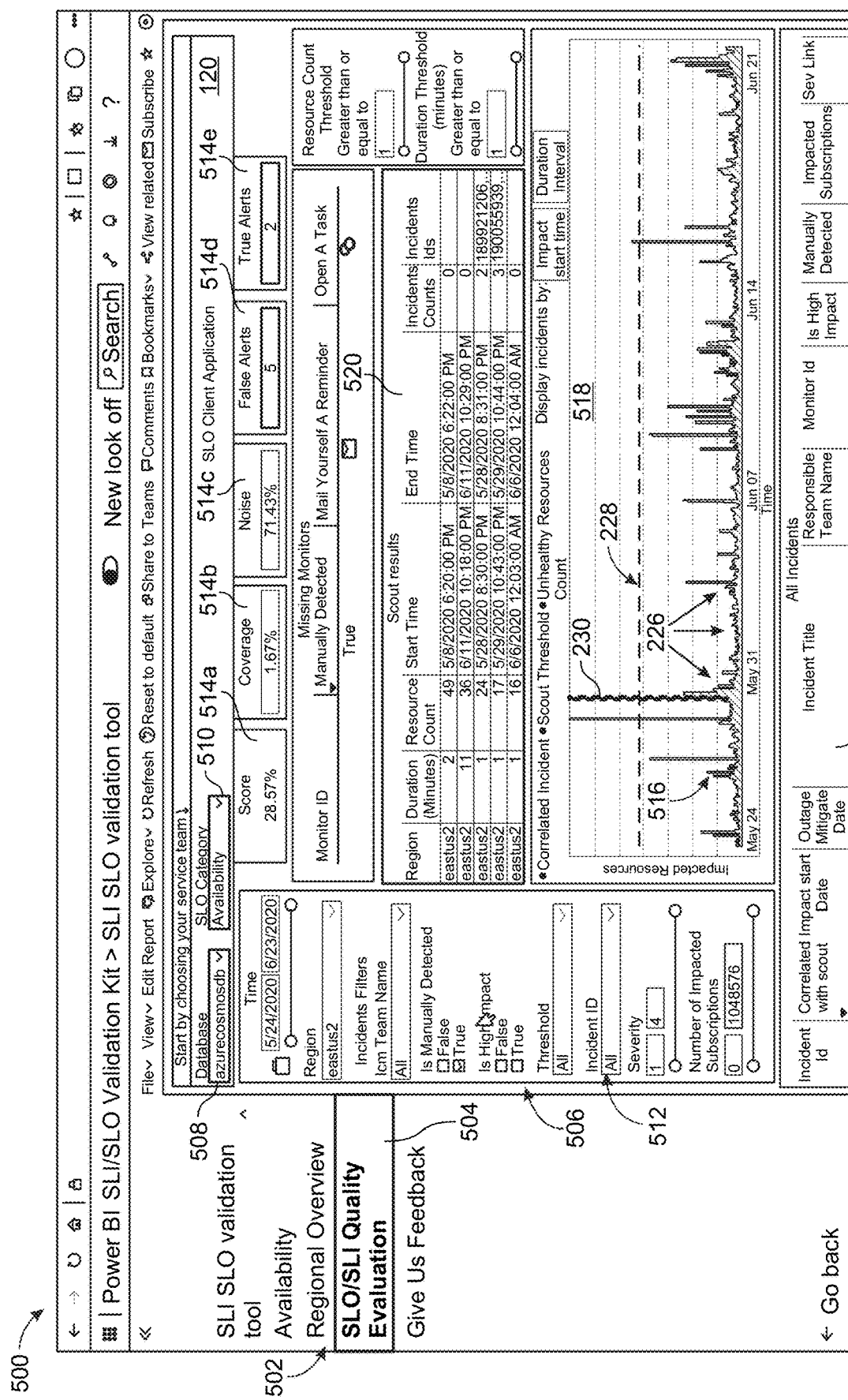
FIG. 5 is a user interface (UI) drawing illustrating an example UI of an SLO client application in accordance with some of the disclosed embodiments.

Among other programs, the applications 118 specifically include an SLO client application 120 that is able to access the machine-learned statistics about the correlative nature of different operational metrics of a remote cloud environment to identified cloud incidents. An example UI of the SLO client application 120 is shown in FIG. 5, which is discussed in more detail below. Using the SLO client application 120, an IT professional may view different statistics that are learned from a cloud service that analyzes whether different operational metrics did or did not exceed their respective metric thresholds during identified cloud incidents and/or whether the metrics exceeded their metric thresholds at other times when the cloud incidents were not identified. In some embodiments, such machine learning is performed by the cloud service referenced in FIG. 2 as the "IT monitoring service" 216, which is discussed in more detail below.

Traditionally, IT professionals needed to guess the operational metrics that best correlated with cloud incidents, and then needed to verify whether such guessing was accurate, which is quite laborious, prone to human error, and is subject to the skill of the IT professional. Instead, the disclosed embodiments rely on the aforementioned cloud-based IT monitoring service to machine learn the metrics that have historically been most correlated to the cloud incidents. Once learned, these correlated metrics may be shown to an IT professional through the SLO client application 120 or used by the cloud environment to detect or predict cloud incidents. For instance, an operational metric that is shown to be highly correlated with cloud incidents (e.g., more than 90% of the time the operational metric spikes a cloud incident occurs) can be monitored and used to detect cloud incidents before they are otherwise identified.

Figure 2:
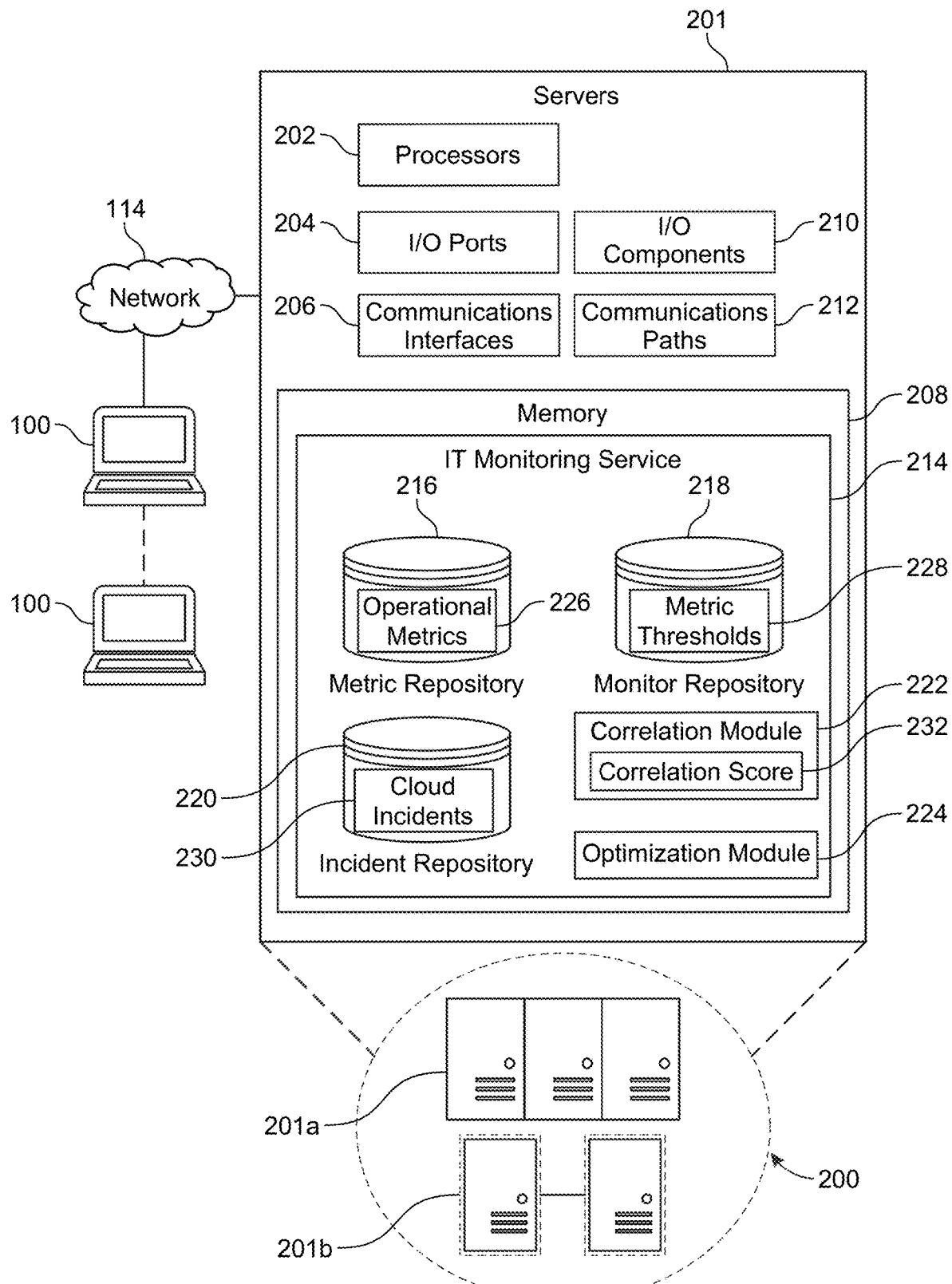
FIG. 2 illustrates a block diagram of a networking environment for operating a cloud service that machine learns the operational metrics of a cloud environment that are most correlated—and, thus, most predictive—of cloud incidents in accordance with some of the disclosed embodiments.
Figure 9:
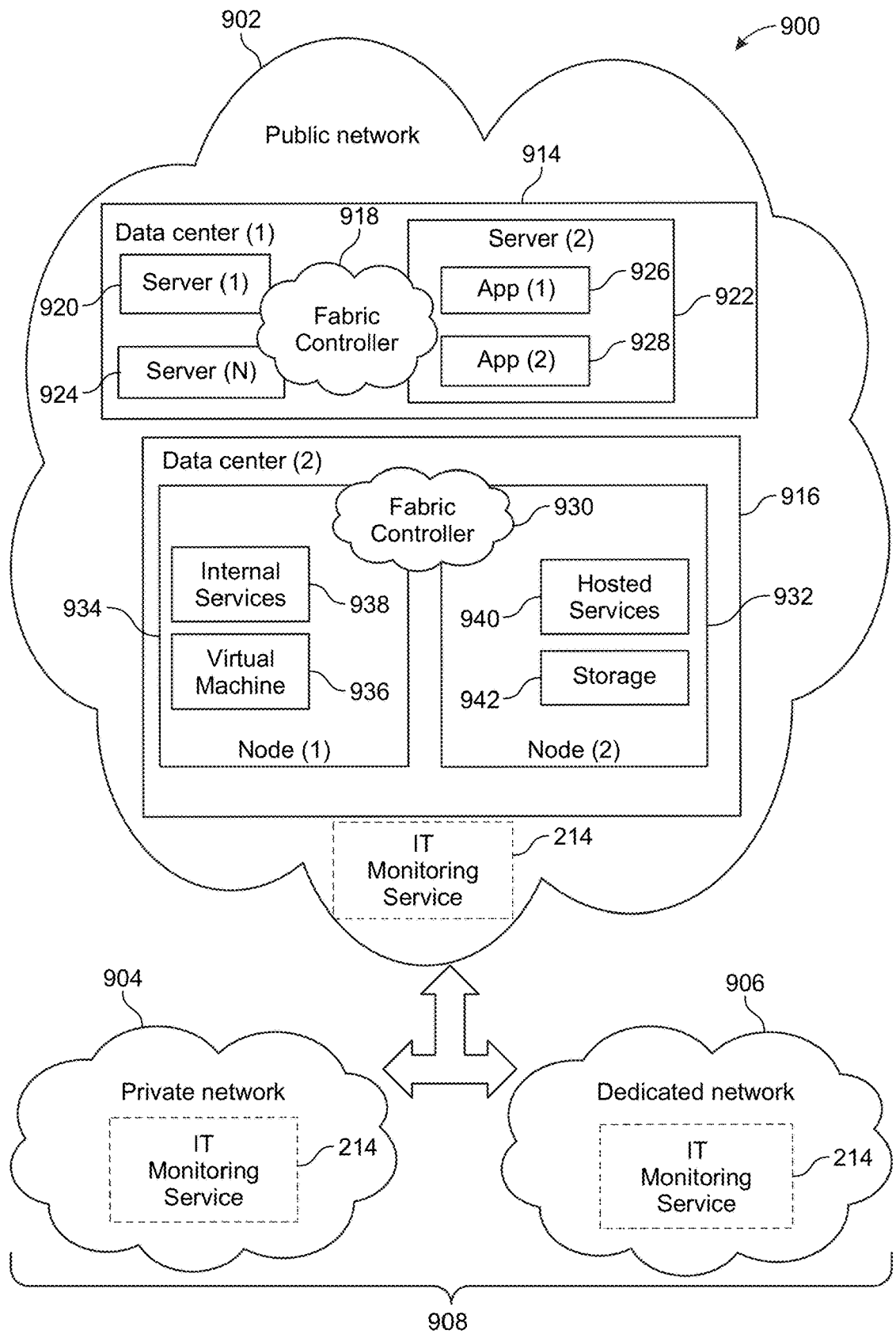
FIG. 9 is a block diagram of one example of a cloud environment that may be used to host the disclosed IT monitoring service in accordance with some of the disclosed embodiments.

FIG. 2 illustrates a block diagram of a networking environment for operating a cloud service that machine learns the operational metrics of a cloud environment 200 that are most correlated—and, thus, most predictive—of cloud incidents in accordance with some of the disclosed embodiments. As shown, various client computing devices 100 communicate over a network 114 with a collection of servers 202 that make up the cloud environment 200. The servers 202 may include physical servers 202a, VMs 202b, or a combination thereof, and may include various dedicated, relational, virtual, private, public, hybrid, or other cloud-based resource. An example server topology for the cloud environment 200 is illustrated in FIG. 9 and discussed in more depth below. One skilled in the art will understand and appreciate that different server topologies may be used to construct the cloud environment 200.

Specifically, the servers 202 include or have access to various processors 204, I/O ports 204, a communications interface 206, computer-storage memory 208, I/O components 210, and a communications path 212. The processors 204 supports server an OS that underlies the execution of software, applications, and computer programs thereon. In one instance, the computing unit is configured with tangible hardware elements, or machines, that are integral, or operably coupled, to the servers 201a,b to enable each device to perform a variety of processes and operations. The I/O ports 204, communications interface 206, computer-storage memory 208, I/O components 210, and communications path 212 may operate in the same manner as the similarly referenced components of FIG. 1.

An IT monitoring service 214 is stored in the memory 208 and executable by the processors 204 of the cloud environment 200. The IT monitoring service 214 may be implemented partly or wholly as software code, firmware, hardware, or hardware. In some embodiments, the IT monitoring service 214 has access to three data storage repositories: a metric repository 216, a monitor repository 218, and an incident repository 220. These three repositories 216-220 may be stored remotely and accessibly the cloud environment 200. Additionally, the IT monitoring service 214 includes a correlation module 222 and (optionally) an optimization module 224 that operate to machine learn the most highly correlative operational metrics to identified cloud incidents.

The metric repository 216 stores operational metrics 226 that are detected in the cloud environment 200. These operational metrics 216 comprise detected values of an operational metric (e.g., CPU usage, IOPs, etc.) at a given time (9:52 pm) or given time series (9:50 p to 9:55 p). For example, a CPU usage operational metric may be detected to reach 50% between 9:50-9:55 p, 20% between 9:55-10:00 p, 80% between 10:00-10:05 p, and so on.

The monitor repository 216 stores metric thresholds 228 for the operational metrics 226. The metric thresholds 228 are specific values that, when exceeded, indicate when an operational threshold may be correlated to a detected cloud incident. The metric thresholds 228 may be manually set by a user (IT professional) or automatically set by the IT monitoring service 214 after analyzing data sets of the operational metrics 226. Additionally, the metric thresholds 228 may be constant across all timeframes or dynamically change over time. For the latter, the metric thresholds 228 may be configured to increase or decrease based on changes in server processing demand, such as during different times of day (e.g., lower thresholds at night than during the days), changes in seasonality-driven demands, detected surges in the demand across various server resources, or the like. In other words, some embodiments use fluid, dynamically changing metric thresholds 228 that change based on historical or current processing demands.

The incident repository 220 stores cloud incidents 222 of the cloud environment 200. These cloud incidents 222 indicate issues, failures, or underperformance (i.e., below a performance threshold) of one or more cloud resources or services of the cloud environment 200. In some examples, the cloud incidents 222 is detected by the cloud environment 200, reported by customers of the cloud environment 200, or identified by an IT professional servicing the cloud environment 200 (e.g., a directly responsible individual or "DRI"). The incident repository 220 may include both identifications and times that the cloud incidents 222 were detected.

The correlation module 218 takes these three sets of data (i.e., the operational metrics 216, metric thresholds 218, and cloud incidents 222) and performs a correlation analysis to determine how correlative a multitude of operational metrics 216 are to the cloud incidents 222. In some embodiments, the correlation analysis involves identifying times that the cloud environment 200 experienced the cloud incidents 230. To do so, some embodiments identify which time series (e.g., 5-minute increments) experienced a cloud incident over a particular timeframe (e.g., over 14 days). The operational metrics 226 are also mapped or associated to their respective time series.

In operation, the correlation module 222 of the IT monitoring service 214 machine learns which of the operational metrics 226 are most correlated to the cloud incidents 230. The machine learning is performed by analyzing the operational metrics 226, metric thresholds 228, and cloud incidents together to find which operational metric 226 exceeded its respective metric threshold 228 more accurately than the other operational metrics 226. In some embodiments, the correlation module 222 calculates the number of times the operational metrics 226 exceeded their metric thresholds 228. The correlation module 222 also determines and calculates the number of times the operational metrics 326 exceeded metric thresholds 328 during times or time series when cloud incidents 230 were and were not occurring. Instances of the operational metrics 226 exceeding metric thresholds 228 during identified cloud incidents 230 are classified, in some embodiments, as "true positives," indicating a correlative event between the operational threshold 226 and the cloud incident 230. Instances of the operational metrics 226 exceeding metric thresholds 228 at times when no cloud incidents 230 are detected are classified, in some embodiments, as "false positives," indicating that no correlation is made between the operational threshold 226 and the cloud incident 230. False positives may be used to calculate the noise that a particular operational metric 226 exhibits. Count values for the true positives and false positives may be tracked and stored for use in calculating various statistics about the correlative nature of the operational metrics 226.

The ratio of true positives to false positives defines the noise of the operational metric 226 relative to the cloud incidents 230. Noisy operational metrics 226 have less correlation cloud incidents 230, and therefore are useful as predictive indicators.

In some embodiments, the correlation module 222 calculates a correlation score 232 based on the total number of times a given operational metric 226 exceeded its metric threshold 228, the number of true positives of the operational metric 226 exceeding its metric threshold 228, and the number of false positives of the operational metric 226 exceeding its metric threshold 228. In some embodiments, the correlation score 232 is calculated using an F-1 score calculated using the following equation:

$$\text{Correlation Score} = \frac{(\text{True positives} - \text{False Positives})}{\substack{\text{Total times Operational Metric} \\ \text{Exceeded Metric Threshold}}}$$

The correlation scores 232 may be computed for numerous operational metrics 230, far more than may reasonably be calculated by a user.

Additionally or alternatively, the correlation scores 222 may be calculated based on the number of times the operational metric 226 did not exceed the metric threshold 228 during a cloud incident 230. In some embodiments, this is done by calculating a number of cloud incidents 230 that did experience a spike in the operational metric 226 (e.g., the true positives) relative to a total number of cloud incidents 230, as shown in the formula below:

$$\text{Correlation Score} = \frac{TruePositive}{\text{Total Number of Cloud Incidents}}$$

The correlation score indicates the correlative nature of an operational metric 226 relative to a cloud incident 230, or, in other words, how reliable a spike in the operational metric 226 is to coincide with a cluster incident 230.

The optimization module 224 is executable to identify which of the operational metrics 226 are most correlated with cloud incidents 230. In some embodiments, the operational metric 226 with the highest correlation score 232 is determined to be the most correlative with the cloud incidents 230. Other embodiments determine the most correlative operational metric 226 to be the one with greatest quantity of true positive counts. Still others apply a count threshold that only considers operational metrics 226 that have a certain number of true positive counts (e.g., more than 2, 3, 4, etc.) and disregard operational metrics 226 that have less than the count threshold of true positives. Using these calculations (e.g., correlation scores 232, true positives, false positives, true positive counts, or the like), the optimization module 224 is able to identify operational metrics 226 that are truly correlated to—and, thus, predictive of—cloud incidents 230.

In some embodiments, the correlation scores 232 are calculated for individual operational metrics 226. Additionally or alternatively, correlation scores 232 may be calculated for combinations of operational metrics 226. In such embodiments, the correlation module 222 may compute a combined correlation score 232 from all of the true and false positives identified by more than one operational metric 226 (e.g., CPU usage and IOPS). The optimization module 224 may then use these combined correlation scores 232 to identify combinations of operational metrics 226 that are highly predictive (e.g., within a certain percentage threshold, as in one operational metric 226 of the combination triggers above a metric threshold 228 more than 90% of the time). So embodiments are able to find the best single or combination of operational metrics 226 for use in identifying cloud incidents 230.

One of the implications of monitoring a lot of operational metrics 226 is the cost associated with the metric thresholds 228. Each metric thresholds 228 has a processing and storage cost with it, and the cloud provider may charge customers for each such metric threshold 228. So even if the metric threshold 228 itself is not noisy (will not produce false alerts), it saves valuable processing resources (as well as possibly customer charges) to avoid monitoring it unless it has high potential of adding coverage that is not otherwise detected.

Figure 3:
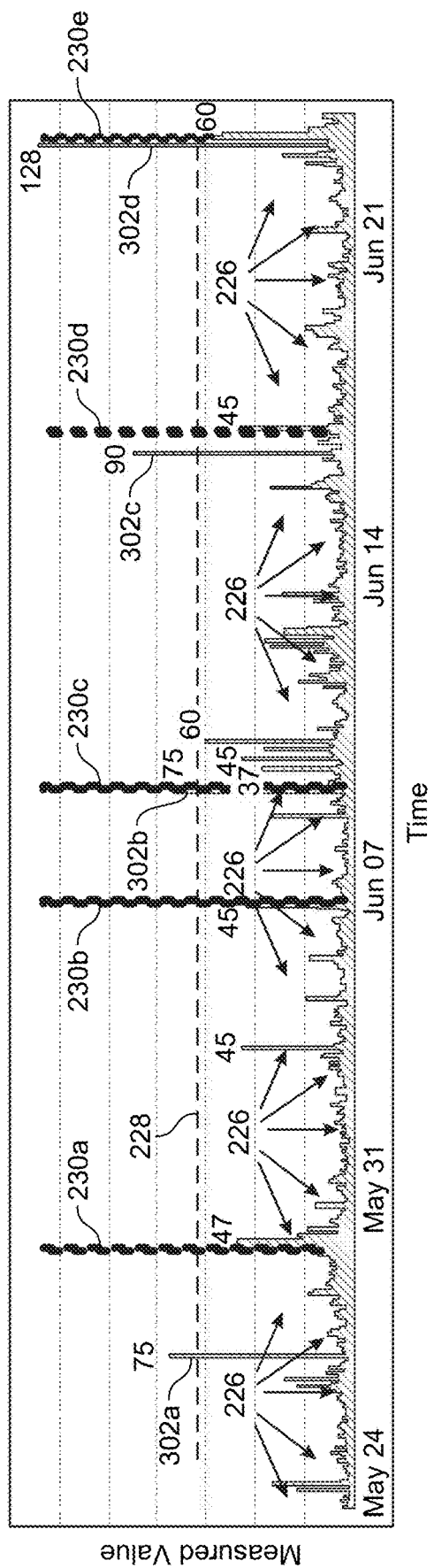
FIG. 3 illustrates a graphical representation of an operational metric measured during different times, a metric threshold, and various cloud incidents that were identified in a cloud environment in accordance with some of the disclosed embodiments.

FIG. 3 illustrates a graphical representation of an operational metric 226 measured during different times, a metric threshold 228, and various cloud incidents 230a-e that were identified in the cloud environment 200. The illustrate relationships between the operational metric 226, metric threshold 228, and cloud incidents 230a-e illustrate what, in some embodiments, the correlation module 222 analyzes to compute the correlation scores 232. Some embodiments actually graph these parameters in the shown manner, or equivalent thereof. Other embodiments do not create such graphs, and instead process the data of these parameters to identify the particular triggers and correlations discussed.

As shown, the operational metric 226 have metric values recorded at different times or times series (e.g., 5-minute intervals). The metric threshold 228 is shown as being constant at a certain value. Alternatively, the metric threshold 228 may change between different values, either statically or dynamically based on demands of the cloud environment 200.

The operational metric 226 exceeded the metric threshold 228 on four occasions, at times 302a, 302b, 302c, and 302d. For each of these times 302a-d, the correlation module 222 checks to determine whether the operational metric 226 exceeded the metric threshold 228 during or within a specific quantity of time or time series (e.g., 5 minutes before or after) an identified cloud incident 230. If so, the correlation module 222 records the event as a true positive or, if not, as a false positive. Put another way, the correlation module 222 identifies when the cloud incidents 230 occurred and identifies spiking operational metrics 226 (e.g., metric values above the metric threshold 228) as either true or false positives based on their time location relative to the cloud incidents 230. As previously discussed, the so-determined true and false positive determinations may be used by the correlation module 222 to calculate the correlation scores 232 for the operational metrics 226, and these correlation scores 232 define the correlative nature of the operational metrics 226.

Some embodiments use the correlation scores 232 to select which of a collection of operational metrics 226 is most correlated to the cloud incidents 230. The same calculations of correlations scores 232 may be computed for different cloud incidents 230. For example, one operational metric 226 may be highly correlated to one cloud incident 230 but not far less correlated to other cloud incidents 230. Thus, some disclosed embodiments compute correlation scores 232 for different operational metrics 226, and those scores may be used—by a user or the optimization module 224—to identify the most correlative operational metric 226 for a particular cloud incident 230.

Figure 4:
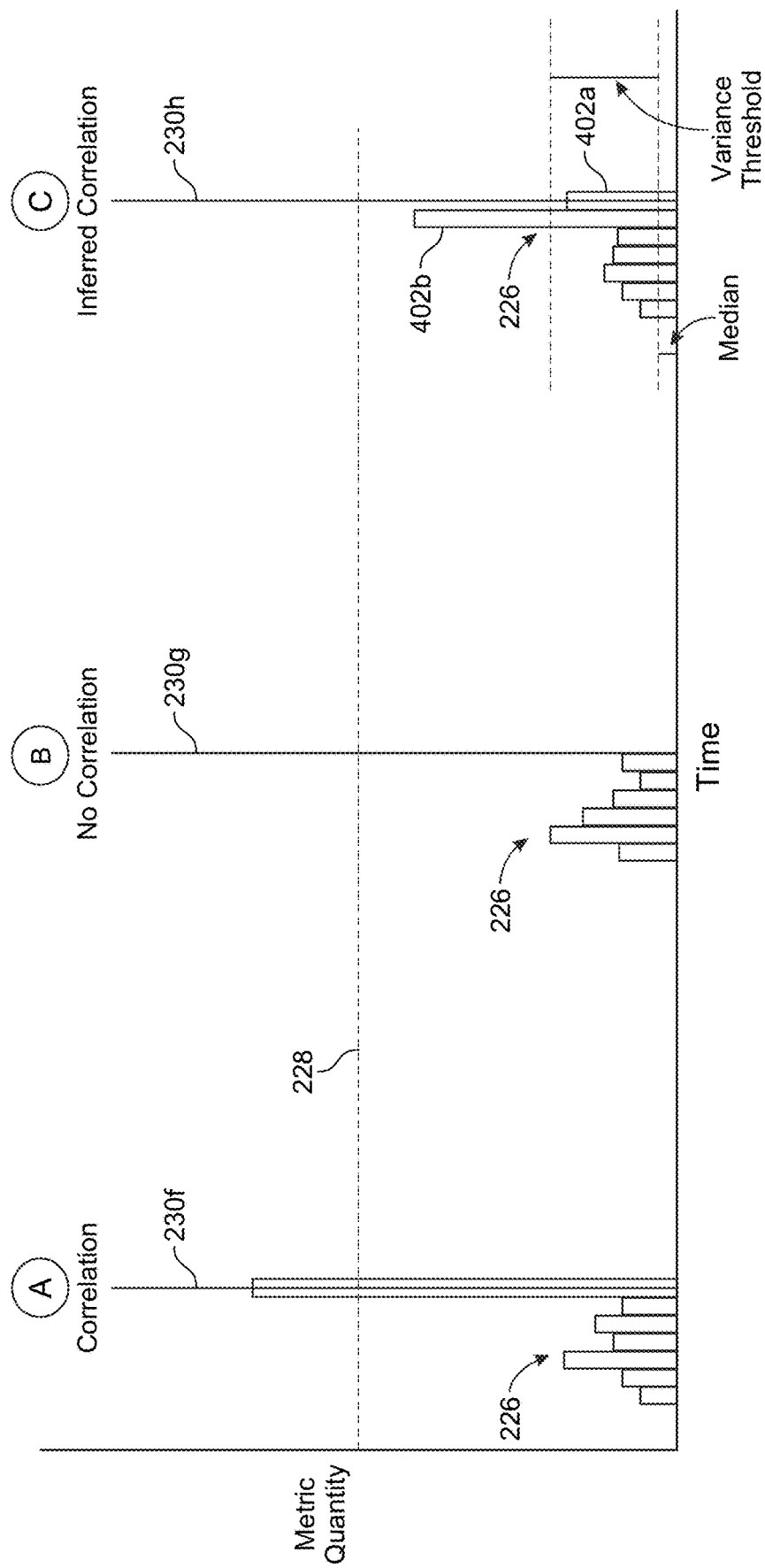
FIG. 4 illustrates a graphical representation of how an operational module categorizes different value profiles of an operational metric in accordance with some of the disclosed embodiments.

FIG. 4 illustrates a graphical representation of how the operational module 222 categorizes different value profiles A, B, and C of the operational metric 226 in accordance with some of the disclosed embodiments. At the different value profiles A, B, and C, the operational metric 226 has different sequences of measured metric values. Embodiments specifically examine the behavior of the operational metric 226 during times of the identified cloud incidents 230 (during "incident times").

At profile A, the operational metric 226 exceeds the metric threshold 228 at the same time—or during the same time series—as cloud incident 230f This results in a true positive being recorded for the operational metric 226, which suggests a correlation between the operational metric 226.

At profile B, the operational metric 226 does not exceed the metric threshold 228 at the same time or time series as cloud incident 230g. Consequently, no correlation is recorded while the total number of cloud incidents 230 is incremented.

Additionally or alternatively, some embodiments infer a true positive for an operational metric 226 by configuring the correlation module 222 to analyze the behavior of operational metric 226 before a cloud incident 230 (shown at cloud incident 230h). In some embodiments, if the operational metric 226 does not spike above the threshold metric 228 but does abnormally increase more than a variance threshold amount above its median or average value, this spike in interpreted by the correlation module 222 as an inferred correlation, thereby being counted as a true positive. In other words, when the behavior the operational metric 226 is abnormally elevated just before the cloud incident 230h, yet not to the level of the threshold metric 228, this abnormal behavior (e.g., variance threshold being exceeded) may be interpreted as a correlative event. Other abnormal metric value spikes may also be used, such as spiking a certain value, percentage, within a certain amount of time, or the like.

As is shown at profile C, the operational metric 226 did not exceed the metric threshold 228 during time series 402a (of the operational metric 226) in which the cloud incident 230h was detected. But time series 402b (of the operational metric 226) immediately before the time series 402a in which the cloud incident 230h was detected did increase dramatically, or at least more than the variance threshold above the median of all or a group of the time shares of the operational metric 226. Some embodiments count such an abnormal spike as a correlative event (e.g., a true positive), and thus another correlation between the operational metric 226 and the cloud incident 230 may be inferred (as indicated by the "Inferred Correlation" label).

Profiles A-C are just three different ways that the operational metric 226 may or may not be correlated with detected cloud incidents 230. Other techniques are used in different embodiments, either in combination with these disclosed techniques or without.

FIG. 5 is a UI drawing illustrating an example UI 500 of the SLO client application 120 shown in FIG. 1 in accordance with some of the disclosed embodiments. The UI 500 provides several options 502 for a user to evaluate the performance of a cloud environment 200. In particular, option 504 for an SLO/SLI quality evaluation brings up an electronic SLO tool 506. The SLO tool 506 includes several options for evaluating the operational metrics 226 of the cloud environment to understand which ones are correlated to cloud incidents 230. Input 508 allows the user to select a particular cloud resource to evaluate. For example, different regionally located databases may be selected (e.g., midwest database, northeast database, European database, Singapore database, etc.). Input 510 allows the user to select particular cloud services to evaluate, such as, for example but without limitation, VMs, IOPS, CPU usage, network connectivity, and the like. Any cloud service may be accessible for testing and selecting using input 510. Various filtering controls 512 are provided as well. As depicted, filtering controls 512 may include options for specifying particular times or timeframes for inspection; identifying types of incidents (e.g., underperformance, failure, or the like); selecting between manually detected or system-detected cloud incidents 230; specifying a particular metric threshold 228 (via a threshold identifier or "ID"); specifying a particular incident (via an incident ID); searching for specific severity levels of cloud incidents 230 (e.g., 1-10; high, medium, or low; or the like); identifying cloud incidents that impact a certain quantity of customer subscriptions; or any other filtering metric.

UI portions 514a-e show the machine learned correlation score and its underlying calculations. Specifically, UI portion 514a shows the correlation score for a particular operational metric 226 that is being examined. UI portion 514b shows the coverage score, which, in some embodiments, is the number of actual cloud incidents recorded in an operational database that detected by a cloud monitor. UI portion 541c shows the noise of the operational metric 226, which may be calculated based on the number of false positives relative to true positives. The false positives are shown at UI 514d as "False Alerts," and the true positives are shown at 514e as "True Alerts."

A graph 516 of the operational metric 226 mapped over time (or time series) is shown in UI portion 518. The graph 516 includes the various measured quantities of the operational metric 226 at different times, the metric threshold 228, and the identified cloud incidents 230. Above the graph, in UI portion 520, instances when the operational metric 226 exceeded the metric threshold 228 are listed, along with "incident counts" that indicate whether a cloud incident 230 was present during the instance. Additionally, in some embodiments, all of the cloud incidents 230 are listed in a lower UI portion 522. Moreover, a "missing monitors" section shows the operational metrics 226 exceeding metric thresholds 228 that were recorded in the incident repository 216 but that do not have any correlations with a cloud incident 230.

Figure 6:
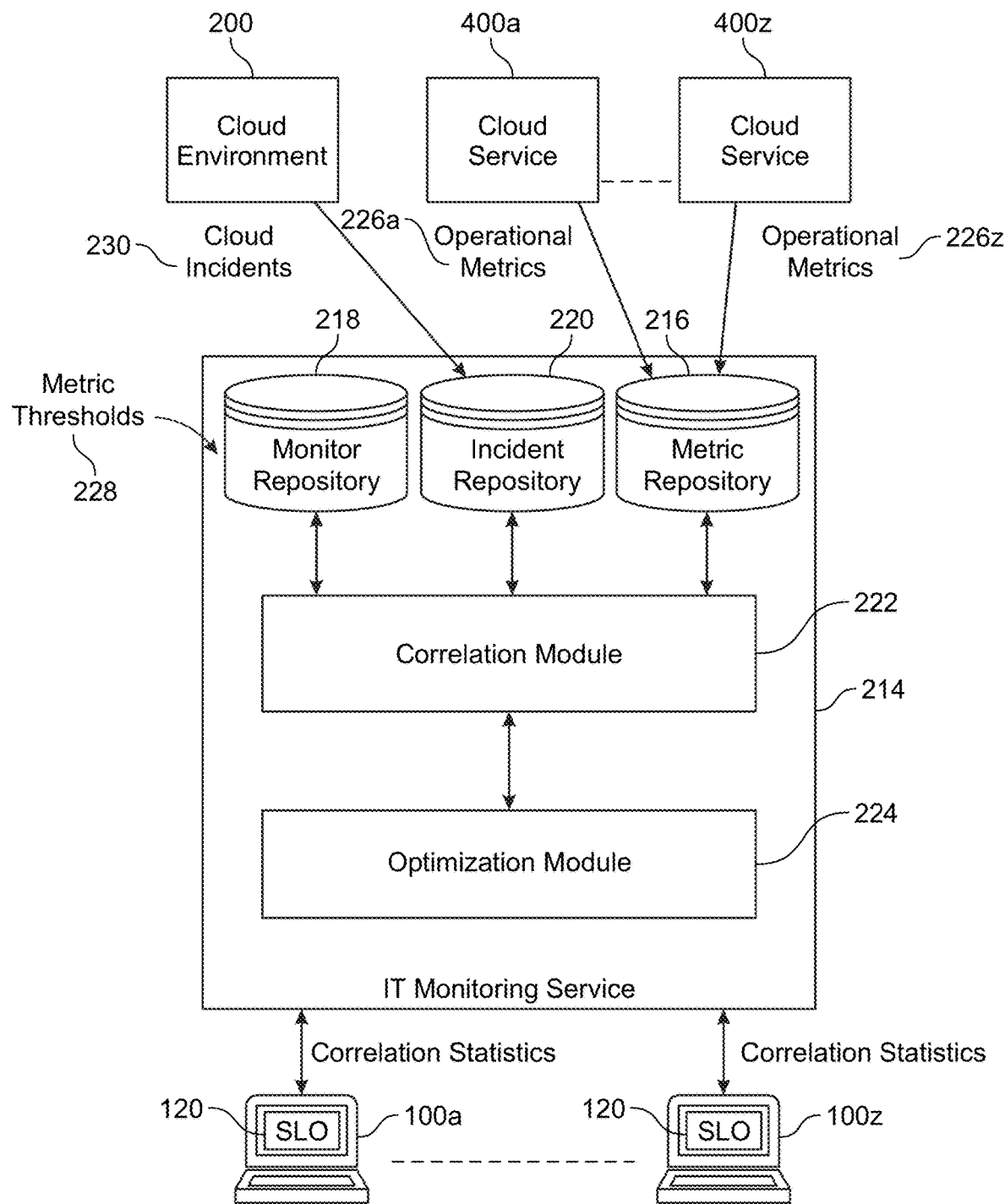
FIG. 6 illustrates a block diagram of an IT monitoring service configured to analyze and machine learn which of a multitude of cloud operational metrics are correlated to cloud incidents in accordance with some of the disclosed embodiments.

FIG. 6 illustrates a block diagram of the IT monitoring service 214 configured to analyze and machine learn which of a multitude of cloud operational metrics 226 are correlated to the cloud incidents 230 in accordance with some of the disclosed embodiments. Multiple cloud services 400a-z generate various operational metrics 226a-z. Values over time for these operational metrics 226a-z are stored in the metric repository 216. Additionally, cloud incidents 230 experienced in a cloud environment 200 are detected and stored in the incident repository 220. In some embodiments, IT professionals examine detected cloud incidents 230 and either confirm or delete them based on whether the cloud incidents 230 are real or not. Further still, metric thresholds 228 are received—either from a user entering them manually or through a cloud service that in a monitor repository 218 The metric thresholds 228 may be manually set by a user, set by a cloud service (e.g., through machine learning or artificial intelligence (AI)), or a combination thereof (e.g., manually set but adjusted by a cloud service based on cloud demands, seasonality, hours of the day, or the like).

In some embodiments, the correlation module 222 accesses these three pieces of data (operational metrics 226, metric thresholds 228, and cloud incidents 230) and machine learns which operational metrics 226a-z are most correlated to the cloud incidents 230. This is done, in some embodiments, through detecting when the operational metrics 226a-z exceeded the metric thresholds 228, and whether they were exceeded during times that the cloud environment 200 was experiencing the cloud incidents 230. Additionally or alternatively, the correlation module 222 may also be configured to detect correlations between the operational metrics 226a-z and the cloud incidents 230 based on the behavior of the operational metrics 226a-z at times (e.g., 5 minutes) or times series (e.g., one time series) before or after cloud incidents 230. As mentioned above, some embodiments infer a correlation—and, thus, register a true positive—when the operational metric 226 increases more than a variance threshold above a median of the metric's value profile or spikes in any of the previously mentioned ways. These machine-learned correlations are used by the correlation module 222 to learn which operational metrics 226a-z are correlated to cloud incidents 230 and which are not. In some embodiments, correlation scores 232 are calculated for various operational metrics 226 and used to identify such correlations. In some embodiments, the correlation scores 232 are calculated for individual operational metrics 226. Additionally or alternatively, correlation scores 232 may be calculated for combinations of operational metrics 226.

Using these calculations from the correlation module 222 (e.g., correlation scores 232, true positives, false positives, true positive counts, or the like), the optimization module 224, in some embodiments, identifies the operational metrics 226 that are truly correlated to—and, thus, predictive of—cloud incidents 230. In such embodiments, the correlation module 222 may compute a combined correlation score 232 from all of the true and false positives identified by more than one operational metric 226a-z. The optimization module 224 may then use these combined correlation scores 232 to identify combinations of operational metrics 226a-z that are highly predictive. So embodiments are able to find the best single or combination of operational metrics 226a-z for use in identifying cloud incidents 230.

Users may access correlations statistics about the various metrics 226a-z using the SLO client application 120a-z on client computing devices 100a-z. In some embodiments, the SLO client application 120 includes UI 500 (shown in FIG. 5) that provides the correlation scores 232 and other calculated statistics as well as the specific times the operational metrics 226a-z exceeded their respective metric thresholds and the cloud incidents 230. Having the disclosed machine-learned correlation data enables the IT professionals to quickly and accurately identify which operational metrics 226a-z are most predictive of cloud incidents 230, without having to waste valuable time and resources guessing and testing different operational metrics 226. Additionally, considerable processing resources are saved because the need for IT professionals to repeatedly test different operational metrics 226 is eliminated, providing both time and resource savings as well as reducing the number of metric thresholds 228 that a customer needs to pay to have monitored.

Figure 7:
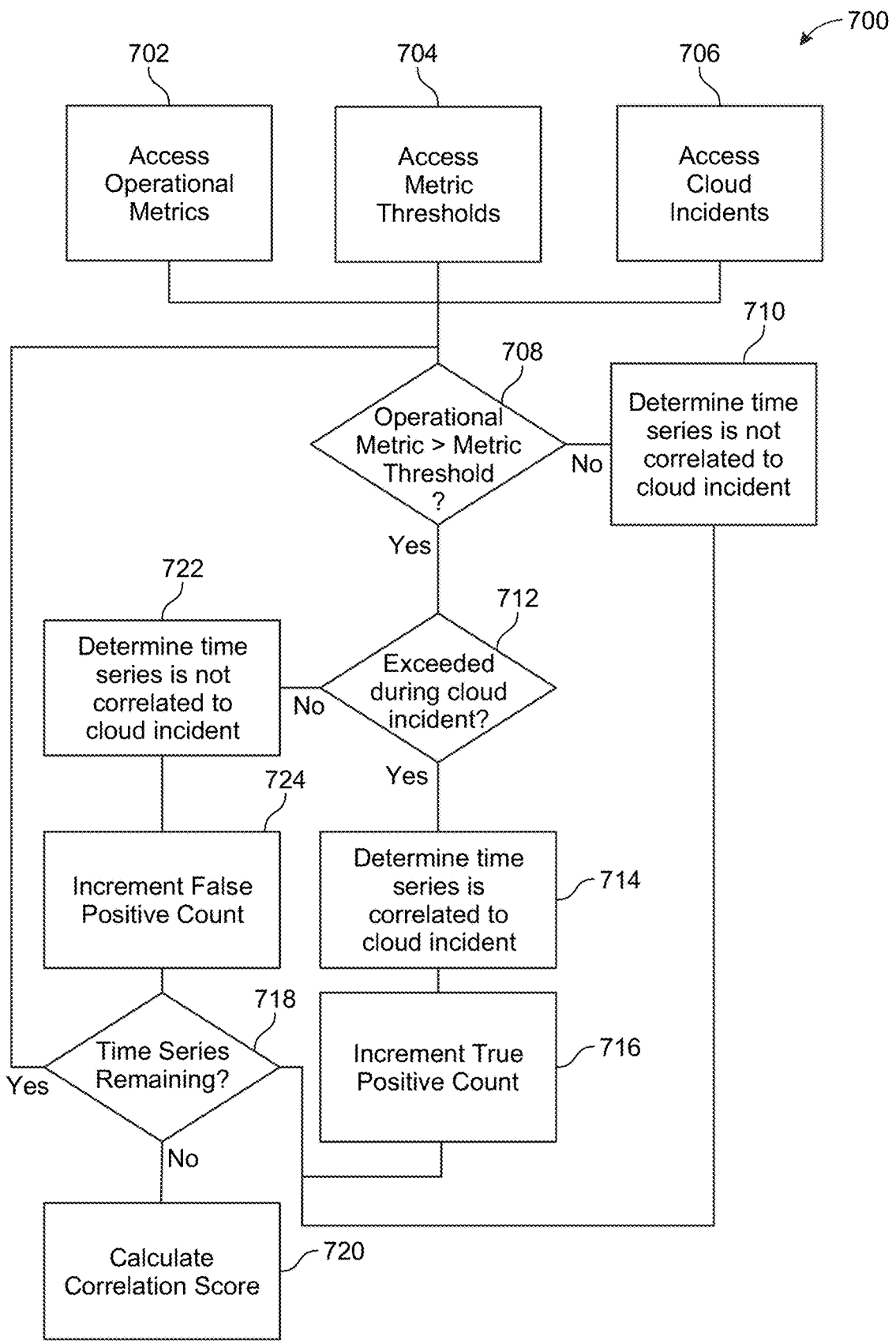
FIG. 7 illustrates a flowchart diagram showing a computer-executed workflow for machine learning operational metrics that are correlated to cloud incidents in accordance with some of the disclosed embodiments.

FIG. 7 illustrates a flowchart diagram showing a computer-executed workflow 700 for machine learning operational metrics that are correlated to cloud incidents in accordance with some of the disclosed embodiments. As shown at 702, 704, and 706, operational metrics, metric thresholds, and cloud incidents are accessed. Such data may be retrieved from or housed in the data storage repositories discussed above. Once accessed, the metric values of the operational metrics are analyzed to see whether they exceed a metric threshold, as shown at 708. This process may be performed for each time entry or time series of metric data of the operational metric. To simplify the discussion, workflow 700 focuses on embodiments where metric values for the operational metrics are delineated by individual time series, e.g., timeframes of a set time like 5 seconds or so.

For a given time series, if the metric value of the operational metric fails to exceed the metric threshold, the IT monitoring service discussed above (specifically the correlation module therein) determines that the time series is not correlated to the cloud incident, as shown at 710. The IT monitoring service moves on to the next time series if there is one, as shown at 718. If so, the next times series is checked against the metric threshold, as shown again at 708. If not, the IT monitoring service calculates a correlation score for the operational metric.

If, however, the metric value in the time series exceeds the metric threshold (following the Yes path from 708), another check is made as to whether the metric value at that time series exceeded the metric threshold during a cloud incident, as shown at 712. If so, the time series is determined to be correlated to the cloud incident, as shown at 714. Plus, a true positive count for the operational metric is incremented, as shown at 716. The cycle repeats as the next time series is checked or, if none, the correlation score is calculated, as shown at 718, 708, and 720.

Returning to 712, if the metric value exceeded the metric threshold at a time when cluster incidents were not detected, the time series is determined to not be correlated to a cloud incident, as shown at 722. A false positive count is incremented, as shown at 724. And the IT monitoring service checks other time series, as shown at 718, 708, and 720.

Using workflow 700, correlation scores are calculated for various operational metrics to determine the likelihood that they are correlated with cluster incidents. In some embodiments, these scores are based on the true and false positive counts. Additionally or alternatively, the correlation may be based on the behavior of the operational metric just before or after (e.g., 1-5 time series before or after) the cluster incidents. A workflow of such an embodiment is discussed next.

Figure 8:
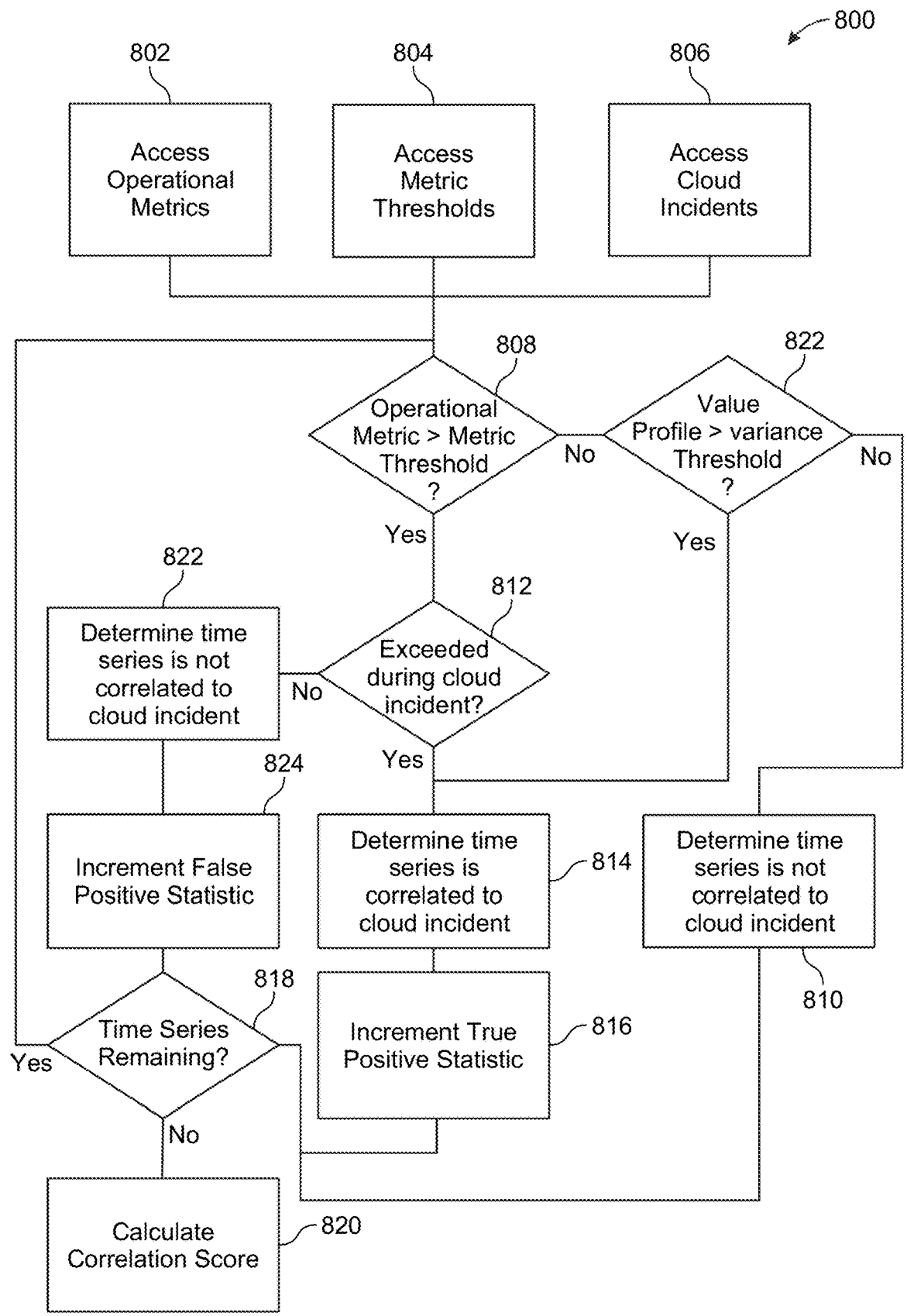
FIG. 8 illustrates a flowchart diagram showing another computer-executed workflow for machine learning operational metrics that are correlated to cloud incidents in accordance with some of the disclosed embodiments.

FIG. 8 illustrates a flowchart diagram showing another computer-executed workflow 800 for machine learning operational metrics that are correlated to cloud incidents in accordance with some of the disclosed embodiments. As shown at 802, 804, and 806, operational metrics, metric thresholds, and cloud incidents are accessed. Such data may be retrieved from or housed in the data storage repositories discussed above. Once accessed, the metric values of the operational metrics are analyzed to see whether they exceed a metric threshold, as shown at 808. This process may be performed for each time entry or time series of metric data of the operational metric.

For a given time series, if the metric value of the operational metric fails to exceed the metric threshold, the IT monitoring service in the disclosed embodiment checks the value profile around (e.g., within 1-5 time series before or after) the time series of detected cloud incidents, as shown at 822. Again, value profiles comprise the metric values of the operation metric during those checked time series before or after the cloud incident. If the value profile has metric values that exceed a variance threshold, the time series is determined to be correlated to the cloud incident, as shown at 814, and the true positive count is incremented, as shown at 816. Yet, if the value profile has metric values that do not exceed the variance threshold, the time series is determined not to be correlated to the cloud incident, as shown at 810, and the next time series is checked, as shown at 818, 808, and 820.

Returning to 808, if the metric value in the time series exceeds the metric threshold (following the Yes path from 808), another check is made as to whether the metric value at that time series exceeded the metric threshold during a cloud incident, as shown at 812. If so, the time series is determined to be correlated to the cloud incident, as shown at 814. Plus, a true positive count for the operational metric is incremented, as shown at 816. The cycle repeats as the next time series is checked or, if none, the correlation score is calculated, as shown at 818, 808, and 820.

Returning to 812, if the metric value exceeded the metric threshold at a time when cluster incidents were not detected, the time series is determined to not be correlated to a cloud incident, as shown at 722. A false positive count is incremented, as shown at 724. And the IT monitoring service checks other time series, as shown at 718, 708, and 720.

Example Cloud-Computing Environment

FIG. 9 illustrates a block diagram of one example of a cloud-computing environment (cloud environment) 900, in accordance with some of the disclosed embodiments. Cloud environment 900 includes a public network 902, a private network 904, and a dedicated network 906. Public network 902 may be a public cloud-based network of computing resources, for example. Private network 904 may be a private enterprise network or private cloud-based network of computing resources. And dedicated network 906 may be a third-party network or dedicated cloud-based network of computing resources. In some examples, the IT monitoring service 214 disclosed herein, and shown in FIGS. 2-3, may be hosted on either the public network 902, private network 904, and/or dedicated network 906.

Hybrid cloud 808 may include any combination of public network 902, private network 904, and dedicated network 906. For example, dedicated network 906 may be optional, with hybrid cloud 908 comprised of public network 902 and private network 904. Along these lines, some cloud customers may opt to only host a portion of their customer data (not shown) in the public network 902 and/or dedicated network 906, retaining some of the customers' data or hosting of customer services in the private network 904. For example, a customer that manages healthcare data or stock brokerage accounts may elect or be required to maintain various controls over the dissemination of healthcare or account data stored in its data center or the applications processing such data (e.g., software for reading radiology scans, trading stocks, etc.). Myriad other scenarios exist whereby customers may desire or need to keep certain portions of data centers under the customers' own management. Thus, in some examples, customer data centers may use a hybrid cloud 908 in which some data storage and processing is performed in the public network 902 while other data storage and processing is performed in the dedicated network 906.

Public network 902 may include data centers configured to host and support operations, including tasks of a distributed application, according to the fabric controller 918. It will be understood and appreciated that data center 914 and data center 916 shown in FIG. 9 are merely examples of suitable implementations for accommodating one or more distributed applications, and are not intended to suggest any limitation as to the scope of use or functionality of examples disclosed herein. Neither should data center 914 and data center 916 be interpreted as having any dependency or requirement related to any single resource, combination of resources, combination of servers (e.g., servers 920 and 924) combination of nodes (e.g., nodes 932 and 934), or a set of application programming interfaces (APIs) to access the resources, servers, and/or nodes.

Data center 914 illustrates a data center comprising a plurality of servers, such as servers 920 and 924. A fabric controller 918 is responsible for automatically managing the servers 920 and 924 and distributing tasks and other resources within the data center 914. By way of example, the fabric controller 918 may rely on a service model (e.g., designed by a customer that owns the distributed application) to provide guidance on how, where, and when to configure server 922 and how, where, and when to place application 926 and application 928 thereon. One or more role instances of a distributed application may be placed on one or more of the servers 920 and 924 of data center 914, where the one or more role instances may represent the portions of software, component programs, or instances of roles that participate in the distributed application. In other examples, one or more of the role instances may represent stored data that are accessible to the distributed application.

Data center 916 illustrates a data center comprising a plurality of nodes, such as node 932 and node 934. One or more virtual machines may run on nodes of data center 916, such as virtual machine 936 of node 934 for example. Although FIG. 9 depicts a single virtual node on a single node of data center 916, any number of virtual nodes may be implemented on any number of nodes of the data center in accordance with illustrative embodiments of the disclosure. Generally, virtual machine 936 is allocated to role instances of a distributed application, or service application, based on demands (e.g., amount of processing load) placed on the distributed application. As used herein, the phrases "virtual machine" and "VM" are not meant to be limiting, and may refer to any software, application, operating system, or program that is executed by a processing unit to underlie the functionality of the role instances allocated thereto. Further, the VMs 936 may include processing capacity, storage locations, and other assets within the data center 916 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 930 is responsible for automatically managing the virtual machines running on the nodes of data center 916 and for placing the role instances and other resources (e.g., software components) within the data center 916. By way of example, the fabric controller 930 may rely on a service model (e.g., designed by a customer that owns the service application) to provide guidance on how, where, and when to configure the virtual machines, such as virtual machine 936, and how, where, and when to place the role instances thereon.

As described above, the virtual machines may be dynamically established and configured within one or more nodes of a data center. As illustrated herein, node 932 and node 934 may be any form of computing devices, such as, for example, a personal computer, a desktop computer, a laptop computer, a mobile device, a consumer electronic device, a server, and like. In one instance, the nodes 932 and 934 host and support the operations of the VMs 936, while simultaneously hosting other virtual machines carved out for supporting other tenants of the data center 916, such as internal services 938, hosted services 940, and storage 942. Often, the role instances may include endpoints of distinct service applications owned by different customers.

Typically, each of the nodes include, or is linked to, some form of a processing unit (e.g., CPU, microprocessor, etc.) to support operations of the component(s) running thereon. The processing unit supports an OS that underlies the execution of software, applications, and computer programs of the cloud environment 200. In one instance, the processing unit is configured with tangible hardware elements, or machines, that are integral, or operably coupled, to the nodes to enable each device to perform a variety of processes and operations. In another instance, the processing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via application programming interfaces (APIs). In one instance, one or more of these interconnections may be established via a network cloud, such as public network 902. The network cloud serves to interconnect resources, such as the role instances, which may be distributed across various physical hosts, such as nodes 932 and 934. In addition, the network cloud facilitates communication over channels connecting the role instances of the service applications running in the data center 916. By way of example, the network cloud may include, without limitation, one or more communication networks, such as LANs and/or wide area networks WANs. Such communication networks are commonplace in offices, enterprise-wide computer networks, intranets, and the Internet, and therefore need not be discussed at length herein.

Although described in connection with example servers 201a,b, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Example Computing Device

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments where tasks are performed by remote-processing devices that are linked through a communications network.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media devices and communication media. Computer storage media devices include volatile and nonvolatile, removable and non-removable memory implemented in any method or technology for storage of information such as computer readable instructions, data structures, program modules, or the like. Computer storage media devices are tangible and mutually exclusive to communication media. Computer storage media devices are implemented in hardware and exclude carrier waves and propagated signals. Computer storage media devices for purposes of this disclosure are not signals per se. Example computer storage media devices include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Additional Examples

Some examples are directed to a method for machine learning operational metrics that are correlated to cloud incidents occurring at incident times in a cloud environment, the cloud environment comprising a plurality of cloud servers configured to provide a plurality of cloud services, the method comprising: accessing the operational metrics; accessing metric thresholds associated with the operational metrics; determining when the operational metrics exceeded the metric thresholds during the incident times of the cloud incidents; calculating correlation scores for the operational metrics based, at least in part, on when the operational metrics exceeded the metric thresholds during the incident times of the cloud incidents; and determining correlative natures of the operational metrics based on the calculated correlation scores.

Some embodiments additionally include operations for determining numbers of times the operational metrics exceeded the metric thresholds at other times than the incident times; and basing said calculation of the correlation scores on the determined numbers of times the operational metrics exceeded the metric thresholds at times the other times.

In some embodiments, the incident times comprise at least one times series that span a particular timeframe.

In some embodiments, the at least one timeframe is five seconds.

In some embodiments, the correlation scores are also calculated based on metric values of the operational metrics during timeframes immediately before the incident times.

Some embodiments additionally comprise computing a combined correlation score for a group of the operational metrics, wherein the combined correlation score is based, at least in part, on how many times the group of operational metrics exceeded respective metric thresholds during the incident times.

Some embodiments additionally comprise identifying the group of the operational metrics as being correlated to at least one cloud incident; and notifying a requesting client computing device of the group of the operational metrics being correlated to the at least one cloud incident.

Some embodiments additionally comprise providing the correlative natures of the operational metrics to a client computing device.

Some embodiments additionally comprise displaying the correlative natures of the operational metrics in a SLO client application on the client computing device.

Some embodiments additionally comprise presenting a service level objected (SLO) client application on a client computing device; and displaying a UI in the SLO client application showing at least one of the correlation scores.

Some embodiments additionally comprise displaying, in the UI of the SLO client application, a graphical representation of the operational metric showing at least one cloud incident and metric values for at least one operational metric.

Some embodiments additionally comprise calculating differences between metric values of the operational metrics and median values of the operational metrics; and determining at least one of the operational metrics has a metric value that is greater than a variance threshold above an associated median value of the at least one of the operational metrics but less than a metric threshold; and based on said determination, inferring a correlation between the at least one of the operational metrics and a cloud incident.

In some embodiments, the calculation of the correlation scores is performed by a service in the cloud environment.

Other embodiments are directed to a cloud-computing system configured for machine learning operational metrics that are correlated to cloud incidents occurring at incident times, the cloud-computing system comprising a plurality of cloud servers configured to provide a plurality of cloud services, the method comprising: cloud memory embodied with data storage repositories storing operational metrics of the plurality of cloud services, metric thresholds for the operational metrics, and the cloud incidents; and one or more processors programmed to: access the operational metrics, access metric thresholds associated with the operational metrics, determine when the operational metrics exceeded the metric thresholds during the incident times of the cloud incidents, calculate correlation scores for the operational metrics based, at least in part, on when the operational metrics exceeded the metric thresholds during the incident times of the cloud incidents, and determine correlative natures of the operational metrics based on the calculated correlation scores.

In some embodiments, the one or more processors are further programmed to: determine numbers of times the operational metrics exceeded the metric thresholds at other times than the incident times, and base said calculation of the correlation scores on the determined numbers of times the operational metrics exceeded the metric thresholds at times the other times.

In some embodiments, the incident times comprise at least one times series that span a particular timeframe.

In some embodiments, the correlation scores are also calculated based on metric values of the operational metrics during timeframes immediately before the incident times.

In some embodiments, the one or more processors are further programmed to compute a combined correlation score for a group of the operational metrics, wherein the combined correlation score is based, at least in part, on how many times the group of operational metrics exceeded respective metric thresholds during the incident times.

Other embodiments are directed to one or more computer-storage memory embodied with computer-executable components for machine learning operational metrics that are correlated to cloud incidents occurring at incident times in a cloud environment, the cloud environment comprising a plurality of cloud servers configured to provide a plurality of cloud services, the one or more computer-storage memory comprising: a metric repository configured to store the operational metrics, accessing the operational metrics; a monitor repository configured to store metric thresholds associated for the operational metrics; an incident repository configured to store the cloud incidents; and a correlation module configured to: access the operational metrics, access metric thresholds associated with the operational metrics, determine correlations scores for the operational metrics, wherein each correlations score is calculated based on: (1) true positives of the operational metrics comprising times when the operational metric exceeded a metric threshold during a cloud incident, and (2) false positives of the operational metrics comprising times when the operational metric exceeded the metric threshold at times other than when the cloud incident occurred; and an (IT) monitoring service configured to provide correlation statistics based, at least in part, on the correlation scores to a client computing device.

Some embodiments additionally comprise an optimization module configured to select at least one of the operational metrics as being correlated to at least one of the cloud incidents based on the correlation score.

While the aspects of the disclosure have been described in terms of various examples with their associated operations, a person skilled in the art would appreciate that a combination of operations from any number of different examples is also within scope of the aspects of the disclosure.

The order of execution and performance of the operations in examples of the disclosure illustrated and described herein are not essential and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for machine learning operational metrics that are correlated to cloud incidents occurring at incident times in a cloud environment, the cloud environment comprising a plurality of cloud servers configured to provide a plurality of cloud services, the method comprising:
   accessing the operational metrics;
   accessing metric thresholds associated with the operational metrics;

determining when the operational metrics exceeded the metric thresholds during the incident times of the cloud incidents;

calculating correlation scores for the operational metrics based, at least in part, on when the operational metrics exceeded the metric thresholds during the incident times of the cloud incidents, wherein said calculations comprise, at least:

calculating differences between metric values of the operational metrics and median values of the operational metrics, determining at least one of the operational metrics has a metric value that is greater than a variance threshold above an associated median value of the at least one of the operational metrics but less than a metric threshold, and based on said determination, inferring a correlation between the at least one of the operational metrics and a cloud incident; and determining correlative natures of the operational metrics based on the calculated correlation scores.

2. The method of claim 1, further comprising:

determining numbers of times the operational metrics exceeded the metric thresholds at other times than the incident times; and basing said calculation of the correlation scores on the determined numbers of times the operational metrics exceeded the metric thresholds at times the other times.

3. The method of claim 1, wherein the incident times comprise at least one time series that span a particular timeframe.

4. The method of claim 3, wherein the at least one time series is five seconds.

5. The method of claim 1, wherein the correlation scores are also calculated based on metric values of the operational metrics during timeframes immediately before the incident times.

6. The method of claim 1, further comprising computing a combined correlation score for a group of the operational metrics, wherein the combined correlation score is based, at least in part, on how many times the group of operational metrics exceeded respective metric thresholds during the incident times.

7. The method of claim 6, further comprising:

identifying the group of the operational metrics as being correlated to at least one cloud incident; and notifying a requesting client computing device of the group of the operational metrics being correlated to the at least one cloud incident.

8. The method of claim 1, further comprising providing the correlative natures of the operational metrics to a client computing device.

9. The method of claim 8, further comprising displaying the correlative natures of the operational metrics in a service level objected (SLO) client application on the client computing device.

10. The method of claim 1, further comprising presenting a service level objected (SLO) client application on a client computing device; and displaying a user interface (UI) in the SLO client application showing at least one of the correlation scores.

11. The method of claim 10, further comprising displaying, in the UI of the SLO client application, a graphical representation of the operational metric showing at least one cloud incident and metric values for at least one operational metric.

12. The method of claim 1, wherein the correlation scores are calculated through calculating:

(1) true positives of the operational metrics comprising times when the operational metric exceeded a metric threshold during a cloud incident, and (2) false positives of the operational metrics comprising times when the operational metric exceeded the metric threshold at times other than when the cloud incident occurred.

13. The method of claim 1, wherein said calculation of the correlation scores is performed by a service in the cloud environment.

14. A cloud-computing system configured for machine learning operational metrics that are correlated to cloud incidents occurring at incident times, the cloud-computing system comprising a plurality of cloud servers configured to provide a plurality of cloud services, the cloud-computing system comprising:

cloud memory embodied with data storage repositories storing operational metrics of the plurality of cloud services, metric thresholds for the operational metrics, and the cloud incidents; and one or more processors programmed to:

access the operational metrics, access metric thresholds associated with the operational metrics, determine when the operational metrics exceeded the metric thresholds during the incident times of the cloud incidents, calculate correlation scores for the operational metrics based, at least in part, on when the operational metrics exceeded the metric thresholds during the incident times of the cloud incidents, wherein said calculations comprise, at least:

calculating differences between metric values of the operational metrics and median values of the operational metrics, determining at least one of the operational metrics has a metric value that is greater than a variance threshold above an associated median value of the at least one of the operational metrics but less than a metric threshold, and based on said determination, inferring a correlation between the at least one of the operational metrics and a cloud incident, and store correlative natures of the operational metrics based on the calculated correlation scores.

15. The cloud-computing system of claim 14, wherein the one or more processors are further programmed to:

determine numbers of times the operational metrics exceeded the metric thresholds at other times than the incident times, and base said calculation of the correlation scores on the determined numbers of times the operational metrics exceeded the metric thresholds at times the other times.

16. The cloud-computing system of claim 14, wherein the incident times comprise at least one times series that span a particular timeframe.

17. The cloud-computing system of claim 14, wherein the correlation scores are also calculated based on metric values of the operational metrics during timeframes immediately before the incident times.

18. The cloud-computing system of claim 14, wherein the one or more processors are further programmed to compute a combined correlation score for a group of the operational metrics, wherein the combined correlation score is based, at least in part, on how many times the group of operational metrics exceeded respective metric thresholds during the incident times.

19. One or more computer-storage memory embodied with computer-executable components for machine learning operational metrics that are correlated to cloud incidents occurring at incident times in a cloud environment, the cloud environment comprising a plurality of cloud servers configured to provide a plurality of cloud services, the one or more computer-storage memory comprising:
- a metric repository configured to store the operational metrics,
accessing the operational metrics;
- a monitor repository configured to store metric thresholds associated for the operational metrics;
- an incident repository configured to store the cloud incidents; and
- a correlation module configured to:
  - access the operational metrics,
  - access metric thresholds associated with the operational metrics,
  - determine correlations scores for the operational metrics, wherein the correlations scores are calculated through performance of the following:
    - calculating differences between metric values of the operational metrics and median values of the operational metrics,
    - determining at least one of the operational metrics has a metric value that is greater than a variance threshold above an associated median value of the at least one of the operational metrics but less than a metric threshold, and
    - based on said determination, inferring a correlation between the at least one of the operational metrics and a cloud incident; and
- an information technology (IT) monitoring service configured to provide correlation statistics based, at least in part, on the correlation scores to a client computing device.

20. The one or more computer-storage memory of claim 19, further comprising an optimization module configured to select at least one of the operational metrics as being correlated to at least one of the cloud incidents based on the correlation score.

* * * * *